US009392140B2

(12) United States Patent
Kawano

(10) Patent No.: US 9,392,140 B2
(45) Date of Patent: Jul. 12, 2016

(54) IMAGE PROCESSING APPARATUS

(71) Applicant: FUJI XEROX CO., LTD., Tokyo (JP)

(72) Inventor: Hiroyuki Kawano, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/605,002

(22) Filed: Jan. 26, 2015

(65) Prior Publication Data

US 2016/0088186 A1 Mar. 24, 2016

(30) Foreign Application Priority Data

Sep. 22, 2014 (JP) ................................. 2014-192403

(51) Int. Cl.
*H04N 1/04* (2006.01)
*H04N 1/409* (2006.01)

(52) U.S. Cl.
CPC ..................................... *H04N 1/409* (2013.01)

(58) Field of Classification Search
CPC ...................................................... H04N 1/409
USPC ........................................ 358/1.9, 1.14, 1.15
See application file for complete search history.

(56) References Cited

U.S. PATENT DOCUMENTS

2011/0026085 A1* 2/2011 Tsukahara ........... H04N 1/1903
358/482

FOREIGN PATENT DOCUMENTS

| JP | 56-80963 A | 7/1981 |
| JP | 3-128566 A | 5/1991 |
| JP | 2010-178174 A | 8/2010 |

* cited by examiner

*Primary Examiner* — Houshang Safaipour
(74) *Attorney, Agent, or Firm* — Sughrue Mion, PLLC

(57) ABSTRACT

Provided is an image processing apparatus including a correction unit that corrects a tilt of each partial image data item which is a result of plural sensors reading a medium on which an image of image data is formed so that at least part of a reading region which is read by each of the plural sensors overlaps a reading region of an adjacent sensor, an extraction unit that extracts the image data at a position and in a size at and in which the image data matches the respective partial image data, and a comparison unit that compares partial image data corrected by the correction unit with extracted image data extracted by the extraction unit.

5 Claims, 16 Drawing Sheets

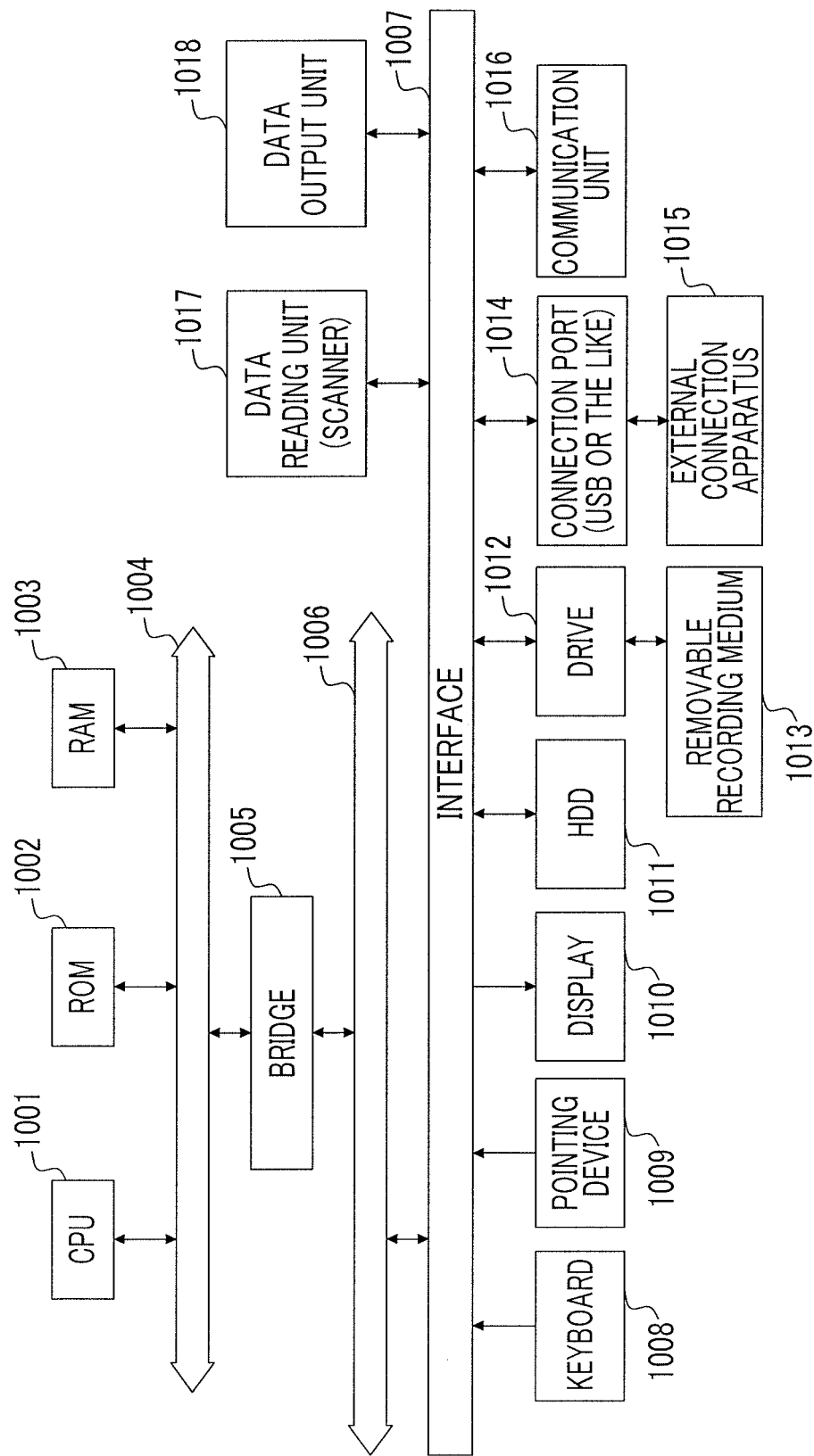

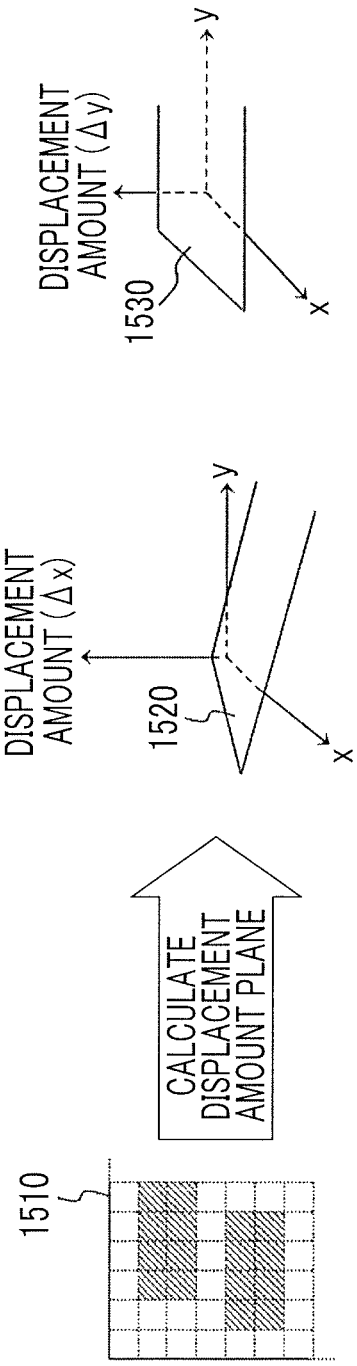

FIG. 16A
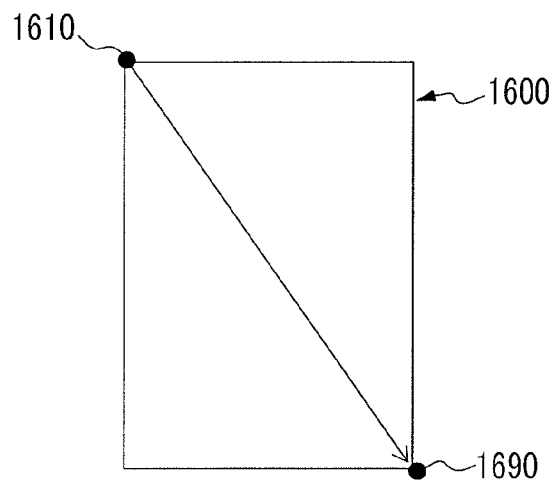
FIG. 16B
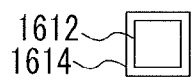
FIG. 16C
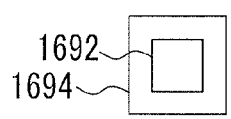
FIG. 17A  FIG. 17B  FIG. 17C
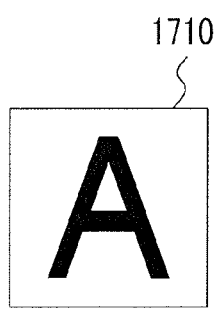 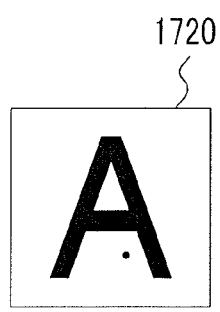 COMPARISON/COLLATION 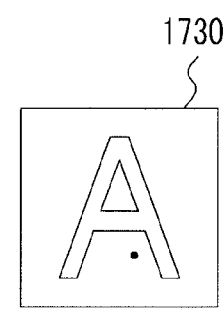

FIG. 18
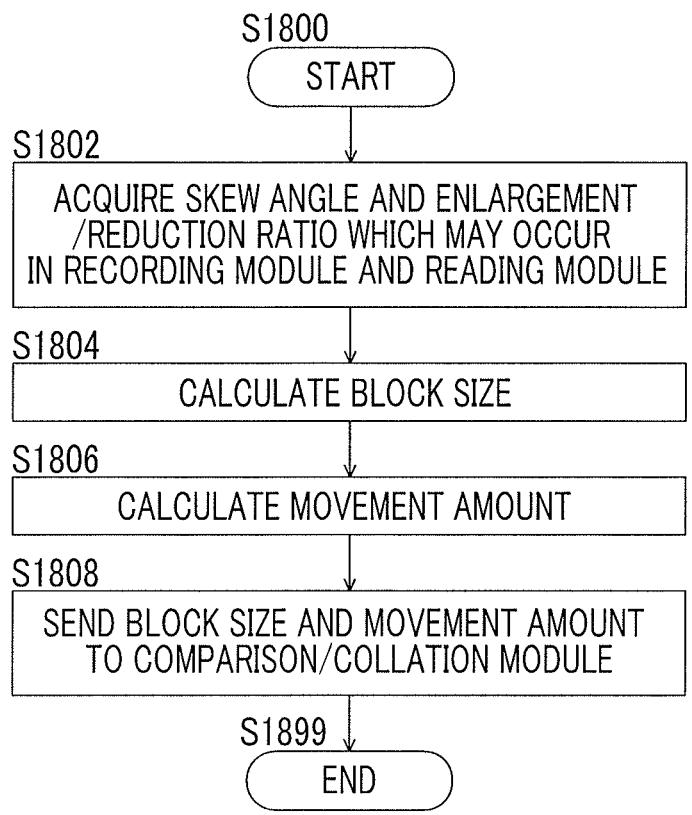
FIG. 19A    FIG. 19B
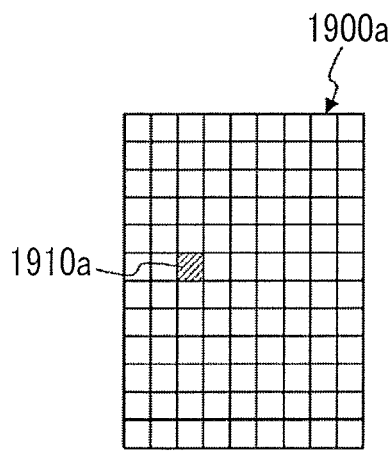
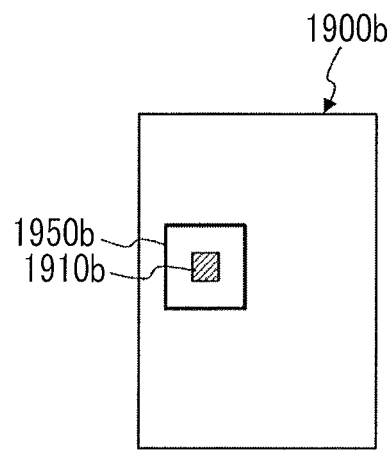

IMAGE PROCESSING APPARATUS

CROSS-REFERENCE TO RELATED APPLICATIONS

This application is based on and claims priority under 35 USC 119 from Japanese Patent Application No. 2014-192403 filed Sep. 22, 2014.

BACKGROUND

Technical Field

The present invention relates to an image processing apparatus.

SUMMARY

According to an aspect of the invention, there is provided an image processing apparatus including:

a correction unit that corrects a tilt of each partial image data item which is a result of plural sensors reading a medium on which an image of image data is formed so that at least part of a reading region which is read by each of the plural sensors overlaps a reading region of an adjacent sensor;

an extraction unit that extracts the image data at a position and in a size at and in which the image data matches the respective partial image data; and a comparison unit that compares partial image data corrected by the correction unit with extracted image data extracted by the extraction unit.

BRIEF DESCRIPTION OF THE DRAWINGS

Exemplary embodiments of the present invention will be described in detail based on the following figures, wherein:

FIG. 10 is a block diagram illustrating a hardware configuration example of a computer which realizes the present exemplary embodiment;

FIGS. 15A to 15C are diagrams illustrating a process example in the data collection/position estimation module;

FIGS. 16A to 16C are diagrams illustrating an example of the size of a search range based on a position in an image;

FIGS. 17A to 17C are diagrams illustrating a defect detecting process example;

FIG. 18 is a flowchart illustrating a process example of calculating a block size and a movement amount;

FIGS. 19A and 19B are diagrams illustrating a process example according to the second exemplary embodiment;

DETAILED DESCRIPTION

Hereinafter, exemplary embodiments for implementing the invention will be described with reference to the drawings.

Figure 1:
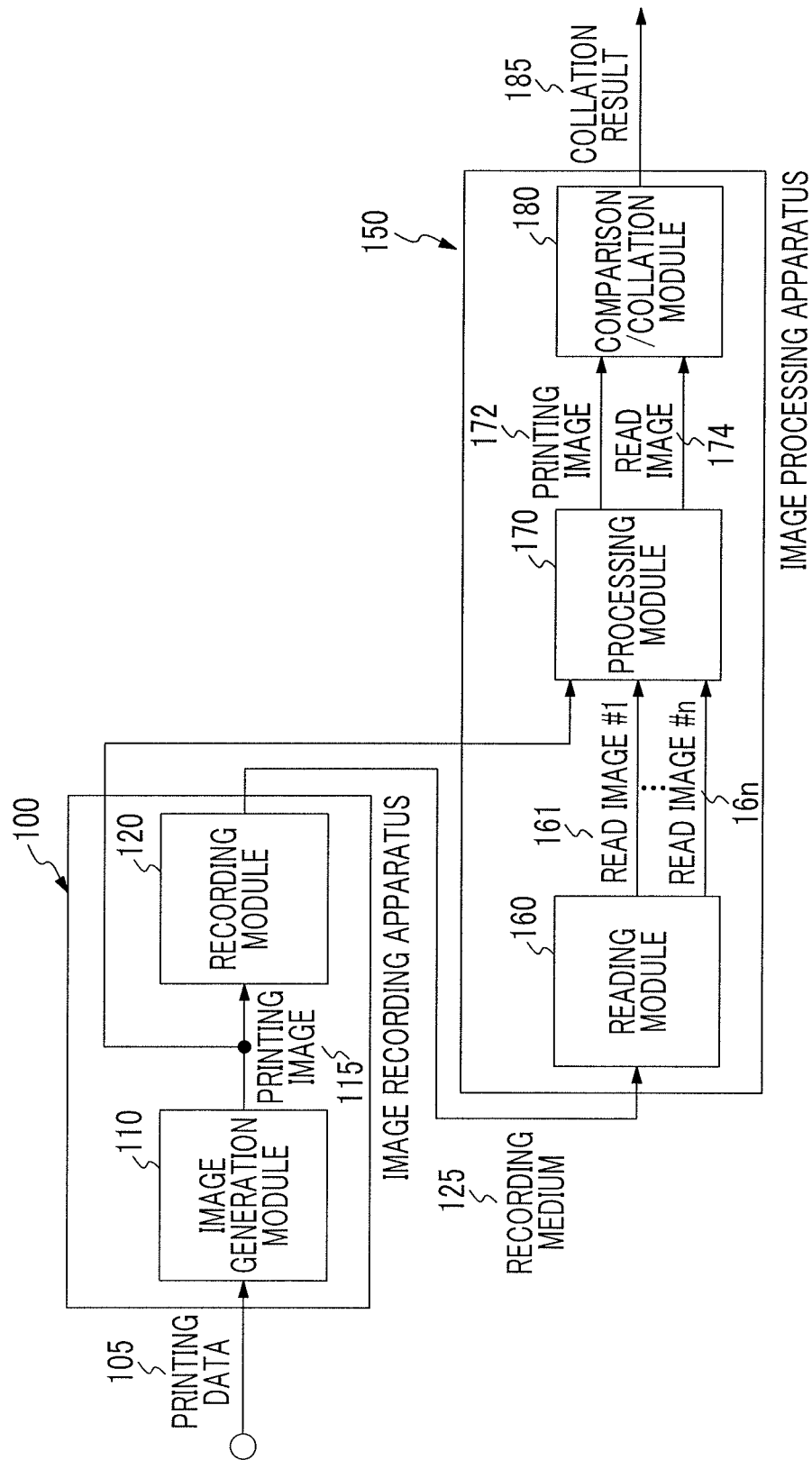
FIG. 1 is a conceptual module configuration diagram illustrating a configuration example according to a first exemplary embodiment.

FIG. 1 is a conceptual module configuration diagram illustrating a configuration example according to a first exemplary embodiment.

In addition, the module indicates components such as software (computer program) and hardware which may be generally and logically divided. Therefore, the module in the present exemplary embodiment indicates not only a module in a computer program but also a module in a hardware configuration. Accordingly, the present exemplary embodiment also includes description of a computer program for causing a computer to function as the module (a program for causing a computer to execute the respective procedures, a program for causing a computer to function as the respective units, or a program for causing a computer to realize the respective functions), a system, and a method. For convenience of the description, although the term "store", or "make store", and terms equivalent to these are used, these terms mean that, in a case of a computer program, the program is stored in a storage device or is controlled so as to be stored in the storage device. In addition, the module may correspond to a function in a one-to-one relationship. In a case of mounting, a single module may be configured by a single program, plural modules may be configured by a single program, or conversely a single module may be configured by plural programs. In addition, plural modules may be executed by a single computer, or a single module may be executed by plural computers using computers in distributed or parallel environments. Further, other modules may be included in a single module. Hereinafter, the term "connection" is used not only in a case of physical connection but also in a case of logical connection (data transmission and reception, instruction, reference relationship between data, and the like). The term "predefined" indicates being defined before a process which is a target, and is used to include a meaning of being defined according to circumstances or states at that time or according to circumstances or states hitherto as long as the process which is a target is not performed, even after a process according to the present exemplary embodiment starts including a state where the process according to the present exemplary embodiment does not start. In a case where there are plural "predefined values", the values may be different, or two or more values (of course, including all the values) may be the same. Further, the phrase having a meaning that "in a case of A, B is performed" is used to mean that "whether or not there is A is determined, if it is determined that there is A, B is performed". However, a case where determination regarding whether or not there is A is unnecessary is excluded.

In addition, the system or the apparatus includes not only a case where plural computers, plural pieces of hardware, plural apparatuses, and the like are configured to be connected to each other via a communication unit such as a network (including communication connection of one-to-one correspondence) but also a case where it is realized by a single computer, a piece of hardware, a single apparatus, and the like. The "apparatus" and the "system" are used as terms having the same meaning. Of course, the "system" does not include social "structures" (social systems) which are merely artificial arrangements.

In addition, for each process performed by each module, or for each process in a case where plural processes are performed in a module, information which is a target is read from a storage device, the process is performed, and then the process result is written in the storage device. Therefore, there are cases where description of reading from the storage device before the process and writing in the storage device after the process may be omitted. The storage device here may include a hard disk, a random access memory (RAM), an external storage medium, a storage device via a communication line, a register in a central processing unit (CPU), or the like.

An image processing apparatus 150 according to a first exemplary embodiment reads image from a recording medium 125 which records the image data thereon and compares the image data with read data, and includes, as illustrated in an example of FIG. 1, a reading module 160, a processing module 170, and a comparison/collation module 180.

The image processing apparatus 150 receives a printing image 115 from an image recording apparatus 100, and reads the recording medium 125 printed by the image recording apparatus 100.

The image recording apparatus 100 includes an image generation module 110 and a recording module 120. The image recording apparatus 100 and the image processing apparatus 150 may be provided in separate casings, and may be provided in a single casing. The image recording apparatus 100 has a function of an output apparatus such as a printer. The image processing apparatus 150 has a function of an image reading apparatus such as a scanner.

The recording indicates that printing is performed by a printer, for example. The image data is data which is not recorded on the recording medium 125 and indicates an image having no so-called noise (defect). The read data is data which is obtained by the reading module 160 reading an image on the recording medium 125 after the image data is recorded on the recording medium 125. Therefore, there is a case where noise may occur therein due to a recording process in the recording module 120 and a reading process in the reading module 160. Here, the noise may include, for example, a case where an image which is not present in image data is recorded on the recording medium 125, a case where an image which is present in image data is not recorded on the recording medium 125, and a case where enlargement, reduction, rotation, movement, distortion, or the like occurs in image data.

In the present exemplary embodiment, outputting for determining whether or not noise occurs due to the recording module 120 and the reading module 160 by comparing image data with read data. In a case where noise occurs, the recording module 120 and the reading module 160 are adjusted in order to reduce the noise.

As will be described later, the reading module 160 does not perform general reading in which a single paper sheet is read with a single sensor, but performs reading in which a single paper sheet is read with plural sensors.

The image generation module 110 is connected to the recording module 120 and the processing module 170 of the image processing apparatus 150, and receives printing data 105 and sends the printing image 115 to the recording module 120 and the processing module 170. The image generation module 110 converts the printing data 105 into the printing image 115. Specifically, image conversion processes which are necessary in printing and include a rasterizing process, a conversion process in a color space which may be reproduced by the recording module 120, and the like, are performed on the printing data 105 in which images such as characters, figures, pictures or the like are described, so that printing may be performed by the recording module 120. The printing data 105 may be electronic data which is described in, for example, a portable document format (PDF), and may be created by document creation application software, or the like. The printing image 115 may be related to any one of binary image data, grayscale image data, and color image data.

The recording module 120 is connected to the image generation module 110 and the reading module 160 of the image processing apparatus 150, and receives the printing image 115 from the image generation module 110 and sends the recording medium 125 to the reading module 160. The recording module 120 records the printing image 115 on a medium such as paper so as to output the recording medium 125. Specifically, the recording module 120 has a function of a printer. In other words, the printing image 115 is recorded on the recording medium 125.

The reading module 160 is connected to the recording module 120 of the image recording apparatus 100 and the processing module 170, and receives the recording medium 125 from the recording module 120 and sends a read image #1:161 . . . and a read image #n:16n to the processing module 170. The reading module 160 reads the recording medium 125 (a medium on which an image of the printing image 115 is recorded) which is output from the recording module 120, and generates a read image which is read data. Specifically, the reading module 160 has a function of a scanner. In other words, the printing image on the recording medium 125 is converted into a read image through photoelectric conversion or the like in a reading element. However, as illustrated in an example of FIG. 4, a single paper sheet is read by plural sensors. In addition, images (partial image data items) read by the respective sensors are sent to the processing module 170 as the read image #1:161 . . . and the read image #n:16n (where n is the number of sensors performing the reading).

Figure 4:
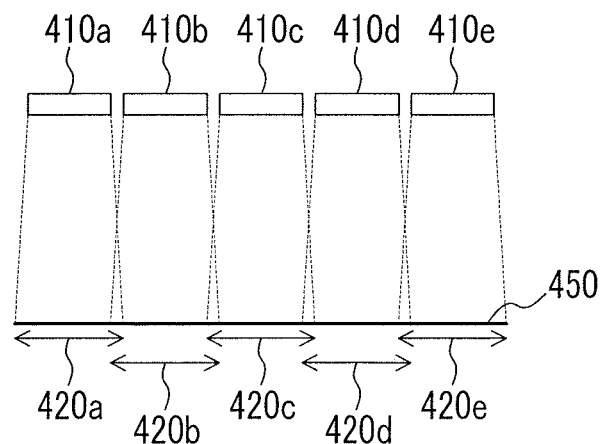
FIG. 4 is a diagram illustrating a processing example according to the first exemplary embodiment.

FIG. 4 is a diagram illustrating a process example according to the first exemplary embodiment (the reading module 160). FIG. 4 illustrates that plural sensors 410 read a single paper sheet 450. The paper sheet 450 is a medium on which an image of image data is formed by the recording module 120. The sensors 410 are arranged in parallel. A reading range 420a is a range of the paper sheet 450 read by a sensor 410a. A reading range 420b is a range of the paper sheet 450 read by a sensor 410b. A reading range 420c is a range of the paper sheet 450 read by a sensor 410c. A reading range 420d is a range of the paper sheet 450 read by a sensor 410d. A reading range 420e is a range of the paper sheet 450 read by a sensor 410e. In each of the reading ranges 420, a region including at least one side of the range overlaps a region including at least one side of the adjacent reading range 420. For example, the right side of the reading range 420a overlaps the left side of the reading range 420b, and the right side of the reading range 420b overlaps the left side of the reading range 420c. In other words, the plural sensors perform reading so that at least part of the reading region overlaps the reading region of the adjacent sensor.

In order to prevent omission of reading due to alignment deviations of the sensors 410, distortions caused by temperature characteristics or the like, or noise such as floating of the paper sheet 450, typically, reading is performed in a state in which reading regions overlap each other between the adjacent sensors 410.

Figure 5:
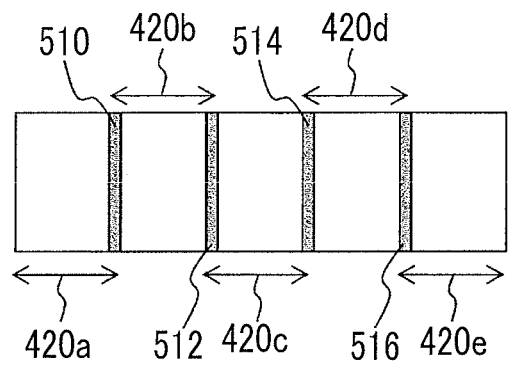
FIG. 5 is a diagram illustrating a processing example according to the first exemplary embodiment.

FIG. 5 is a diagram illustrating a process example according to the first exemplary embodiment. FIG. 5 illustrates the overlapping of the reading ranges 420 in the paper sheet 450 of the example illustrated in FIG. 4 from the top (or the bottom). An overlapping region 510 is a region in which the reading range 420a and the reading range 420b overlap each other. An overlapping region 512 is a region in which the reading range 420b and the reading range 420c overlap each other. An overlapping region 514 is a region in which the reading range 420c and the reading range 420d overlap each other. An overlapping region 516 is a region in which the reading range 420d and the reading range 420e overlap each other. Here, the term "overlap each other" indicates that two sensors read a portion of the same medium. For example, the overlapping region 512 is read by both the sensor 410b and the sensor 41c.

The processing module 170 is connected to the image generation module 110 of the image recording apparatus 100, the reading module 160, and the comparison/collation module 180, and receives the printing image 115 from the image generation module 110 and the read image #1:161 . . . and the read image #n:16n from the reading module 160, and sends a printing image 172 and a read image 174 to the comparison/collation module 180. The processing module 170 corrects a tilt of partial image data. The correction of a tilt may be performed by using an existing technique. For example, a line segment in the partial image data may be extracted, and may be rotated in a reverse direction after an angle between the line segment and a vertical line or a horizontal line is detected. In addition, a tilt may be detected based on a tilt of a side (paper edge) of the recording medium 125. Further, a tilt of partial image data may be corrected based on an angle detected in each partial image data item, and tilts of other partial image data items may be corrected based on an angle detected in any one of partial image data items. The tilt correction may be performed by using, specifically, affine transform.

In addition, the processing module 170 extracts an image from the printing image 115 which is image data, so as to be suitable for positions and sizes of the read image #1:161 and the like. Here, the image is extracted at the same tilt as the tilt of the partial image data. Therefore, at least one side of extracted image data which is an extraction result of the printing image 115 overlaps a region including one side of adjacent extracted image data, in the same manner as in the read image #1:161 and the like.

The processing module 170 may receive the printing image 115 not only from the image generation module 110, but also from an information processing apparatus (an information processing apparatus which sends the printing data 105 to the image recording apparatus 100) which generates the printing data 105, from the recording module 120, and from the reading module 160 in a case where the reading module 160 receives the printing image 115 from the image generation module 110 or the recording module 120.

Further, the processing module 170 may insert a blank space between the partial image data items adjacent to each other of the read image #1:161 and the like so as to correct a tilt, and then may combine the partial image data items with each other so as to generate combined image data. Here, the blank space may have any color (white, black, transparent or the like) and is a region having a fixed value. In addition, the blank space may be a region which is set not to be output as a difference even if the region is compared. In other words, in a case where blank spaces are compared with each other, a region in which it is determined that there is no difference is used as a blank space. In addition, a width of this blank space is equal to or larger than a width of the region in which at least the partial image data items overlap each other. Further, a width of the blank space may be determined in consideration of a tilt angle of the partial image data. In other words, even if a tilt angle is corrected, a width of the blank space is determined so that the overlapping of the partial image data in the longitudinal direction is removed. Consequently, during comparison and collation in the comparison/collation module 180 which will be described later, it is possible to specify in which read image (sensor) a different portion is generated only by referring to coordinates of a comparison result in the width direction. Still further, a width of the blank space may be a width corresponding to a size of a comparison target (block) in the comparison/collation module 180. For example, a multiple of a horizontal width of the comparison target (block) may be used. A blank space may be inserted between extracted image data items which are obtained by dividing the printing image 115 and are adjacent to each other. In this case, the blank space inserted into the extracted image data may be compared in the same condition as in the combined image data when a width thereof is set to a width of a blank space which is inserted into partial image data and is obtained by correcting a tilt.

The comparison/collation module 180 is connected to the processing module 170, and receives the printing image 172 and the read image 174 from the processing module 170 so as to output a collation result 185. The comparison/collation module 180 compares the partial image data (read image #1:161 and the like) corrected by the processing module 170 with the extracted image data (extracted image data of the printing image 115) extracted by the processing module 170. Comparison targets here are the partial image data (the read image #1:161 and the like) of which a tilt is corrected and the extracted image data of the printing image 115.

The comparison/collation module 180 compares the combined image data (combined image data based on the read image #1:161 and the like) generated by the processing module 170 with the image data in which a blank space is inserted between the extracted image data items of the printing image 115. Comparison targets here are a combination of the partial image data items (the read image #1:161 and the like) of which tilts have been corrected, and a combination of extracted image data items of the printing image 115.

The comparison is a process of detecting a difference between both images. For example, an exclusive OR (EOR) process of both images may be performed, and a difference between both of the images may be extracted, and a portion having values other than 0 is detected as a different portion. In addition, there is a process of extracting an image which is present in the printing image 172 but is not present in the read image 174, a process of extracting an image which is not present in the printing image 172 but is present in the read image 174, and the like. It is determined that noise occurs in the different portion.

Here, the outputting of the collation result 185 includes, for example, printing the different portion with a printing apparatus such as a printer, displaying the different portion on a display apparatus such as a display, transmitting an image with an image transmission apparatus such as a facsimile, writing an image in an image storage apparatus such as an image database, storing an image on a recording medium such as a memory card, and sending an image to other information processing apparatuses.

Figure 2:
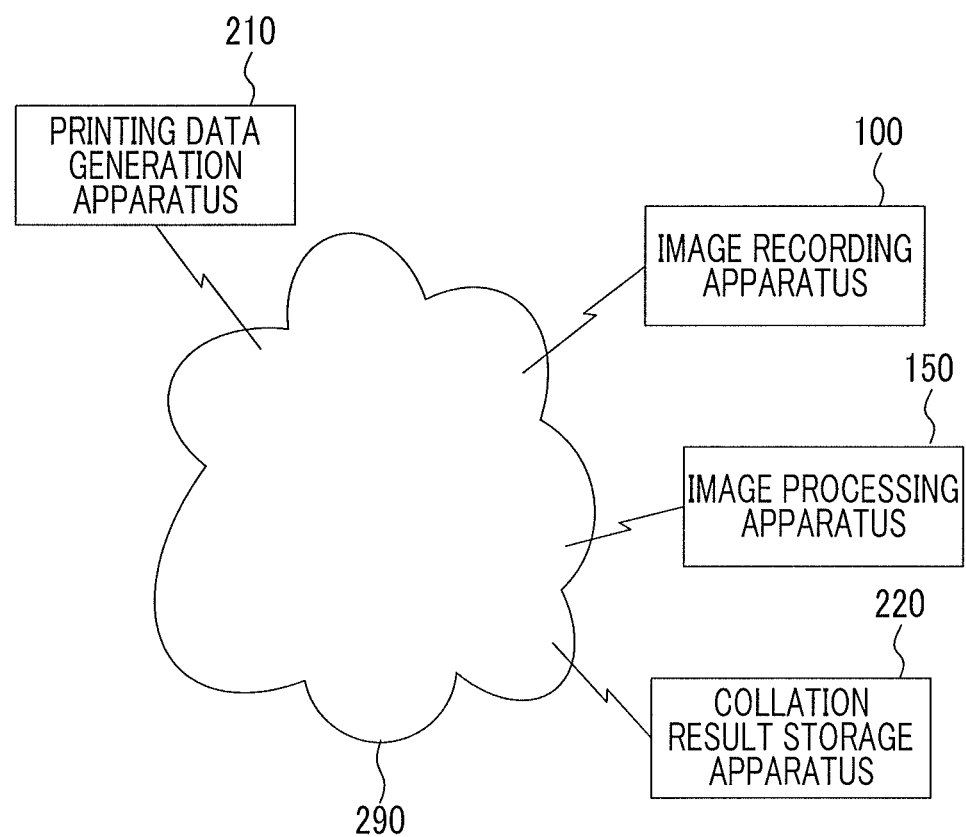
FIG. 2 is a diagram illustrating a system configuration example in a case where the first exemplary embodiment is realized.

FIG. 2 is a diagram illustrating a system configuration example in a case where the first exemplary embodiment is realized.

The image recording apparatus 100, the image processing apparatus 150, a printing data generation apparatus 210, and a collation result storage apparatus 220 are connected to each other via a communication line 290. The communication line 290 may be a wired line, a wireless line, and a combination thereof, and may be, for example, the Internet as a communication infrastructure. The printing data generation apparatus 210 generates the printing data 105, and sends the printing data 105 to the image recording apparatus 100. The image recording apparatus 100 prints the printing data 105 and outputs the recording medium 125. The image processing apparatus 150 reads the recording medium 125, and receives the printing data 105 from the image recording apparatus 100 (or the printing data generation apparatus 210) and sends the collation result 185 to the collation result storage apparatus 220. The collation result storage apparatus 220 receives and stores the collation result 185 from the image processing apparatus 150. The recording module 120 of the image recording apparatus 100 and the reading module 160 of the image processing apparatus 150 are adjusted based on the collation result 185 stored in the collation result storage apparatus 220.

Figure 3:
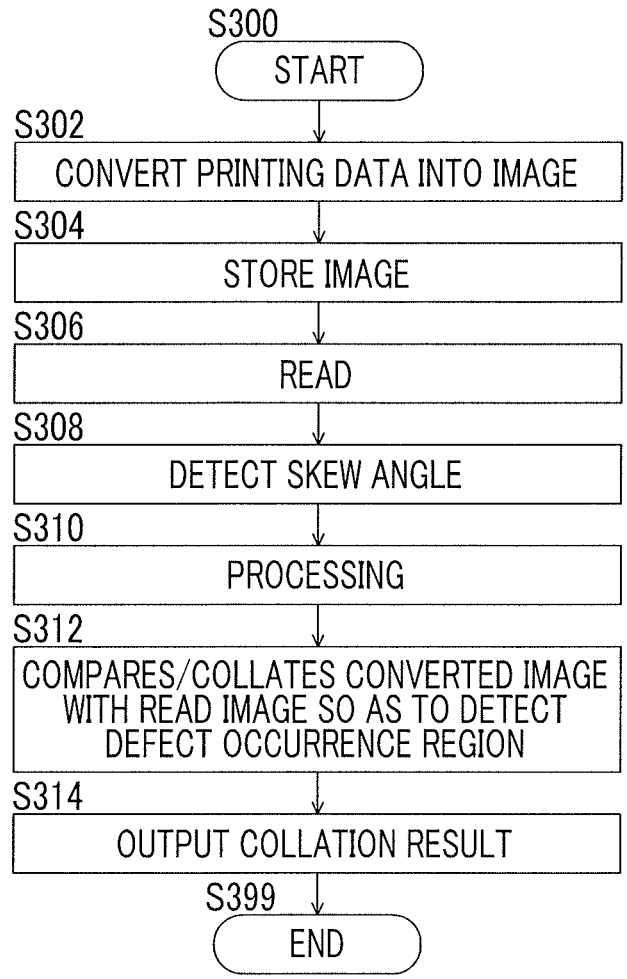
FIG. 3 is a flowchart illustrating a processing example according to the first exemplary embodiment.

FIG. 3 is a flowchart illustrating a process example according to the first exemplary embodiment.

In step S302, the image generation module 110 performs image conversion of the printing data 105 so as to generate the printing image 115.

In step S304, the recording module 120 records the printing image 115 on a medium. The recording medium 125 on which the printing image 115 is printed is generated.

In step S306, the reading module 160 reads the recording medium 125.

Figure 6:
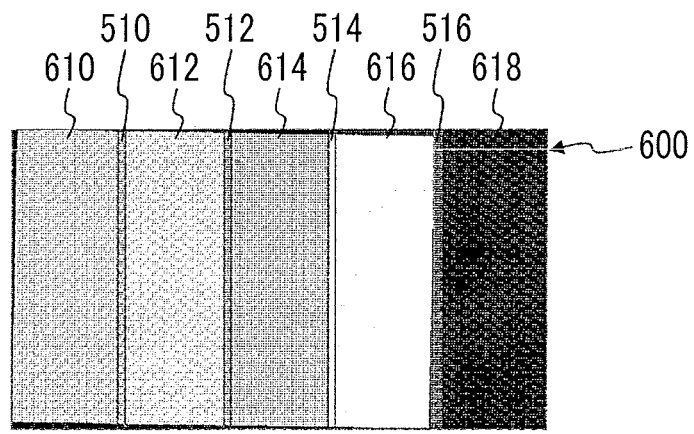
FIG. 6 is a diagram illustrating a processing example according to the first exemplary embodiment.

FIG. 6 is a diagram illustrating a process example according to the first exemplary embodiment. An image 600 indicates an image right after reading is performed. The image 600 is formed by images (read divided images 610, 612, 614, 616 and 618) read by the respective sensors 410, and includes overlapping regions 510, 512, 514 and 516 as overlapping portions. In addition, the overlapping region 510 displays image data items which are respectively read by the sensor 410a and the sensor 410b in an overlapping manner. Therefore, there is a possibility that there may be a difference between a portion of the overlapping region 510 read by the sensor 410a and a portion of the overlapping region 510 read by the sensor 410b.

In step S308, the processing module 170 detects skew angles of the read image #1:161 and the like. For example, a skew angle is detected based on a tilt of a paper edge of the read image.

In step S310, the processing module 170 performs processing on the read image #1:161 . . . and the read image #n:16n, and the printing image 115. As the processing here, a blank space is inserted between the divided read image in accordance with, for example, the skew angle, and a size (block size) of a comparison target in collation performed by the comparison/collation module 180.

Figure 7:
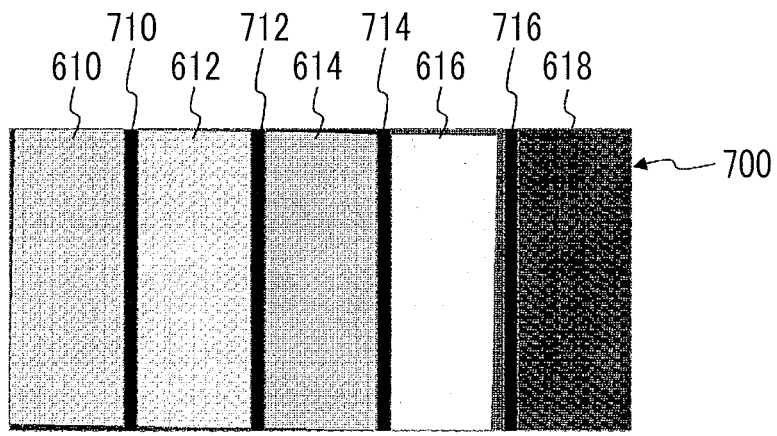
FIG. 7 is a diagram illustrating a processing example according to the first exemplary embodiment.

FIG. 7 is a diagram illustrating a process example according to the first exemplary embodiment. An image 700 indicates an image state in which blank spaces are inserted into the image 600 illustrated in the example of FIG. 6. In other words, a blank space 710 is inserted between the read divided image 610 and the read divided image 612; a blank space 712 is inserted between the read divided image 612 and the read divided image 614; a blank space 714 is inserted between the read divided image 614 and the read divided image 616; and a blank space 716 is inserted between the read divided image 616 and the read divided image 618. In addition, the read divided image 612 includes the overlapping region 510 and the overlapping region 512 read by the sensor 410b.

Figure 8:
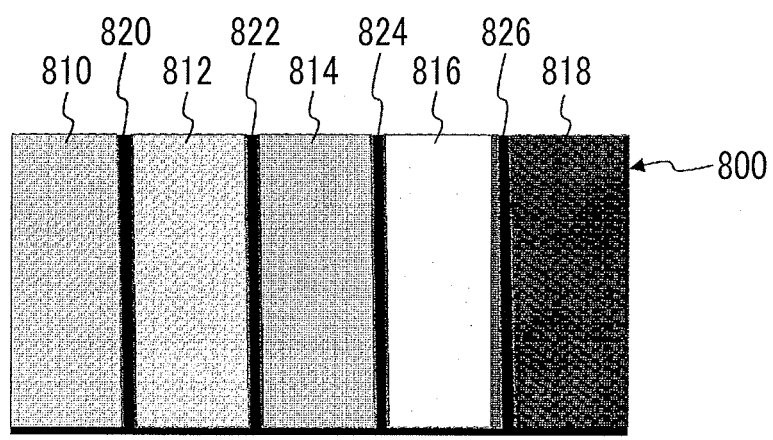
FIG. 8 is a diagram illustrating a processing example according to the first exemplary embodiment.

FIG. 8 is a diagram illustrating a process example according to the first exemplary embodiment. An image 800 indicates an image state in which skew correction is performed on the image 700 illustrated in the example of FIG. 7. In other words, the state is a state in which the tilts of the read divided image 612 and the like are removed. A tilt of any one of the read divided images 610, 612, 614, 616 and 618 may be detected as the tilt here, and the read divided images 610, 612, 614, 616 and 618 may be corrected according to the tilt, and a tilt of each of the read divided images 610, 612, 614, 616 and 618 may be detected, and the read divided images 610, 612, 614, 616 and 618 may be corrected in accordance with each tilt.

Figure 9A:
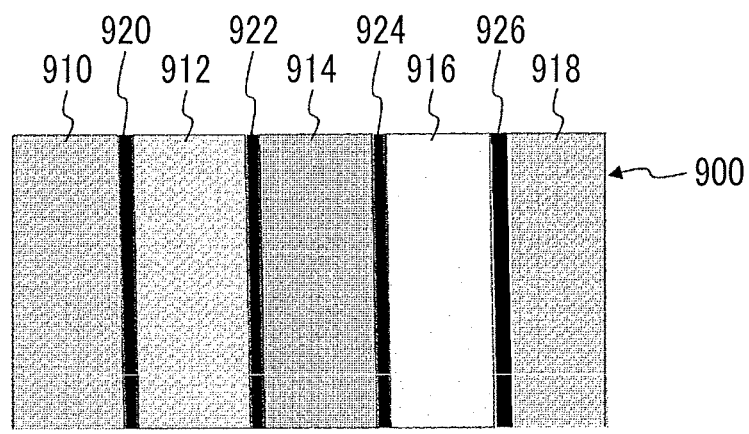
FIGS. 9A and 9B are diagrams illustrating a processing example according to the first exemplary embodiment.
Figure 9B:
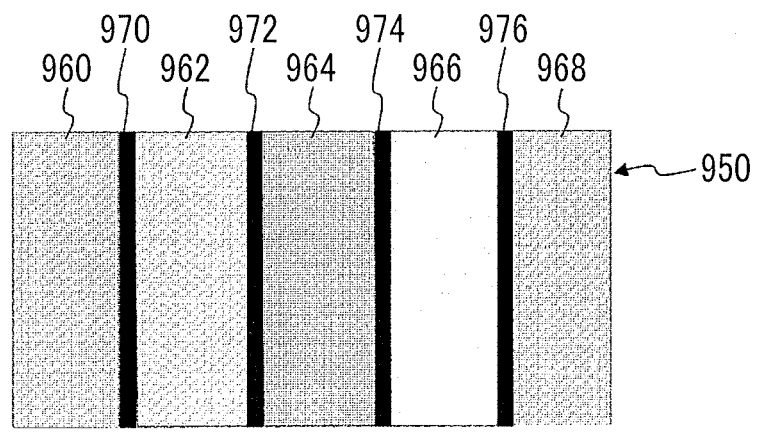

FIGS. 9A and 9B are diagrams illustrating a process example according to the first exemplary embodiment. An image 900 illustrated in an example of FIG. 9A is obtained by performing size correction suitable for a processed output image 950, on the image 800 illustrated in the example of FIG. 8. The size correction here indicates that a bottom side portion (or a top side portion) of the image 800 is removed, and a right side portion (or a left side portion) thereof is removed, in order to generate the same size as the size of the processed output image 950. The processed output image 950 illustrated in an example of FIG. 9B is obtained by extracting the image from the printing data 105 and inserting blank spaces thereinto. In addition, in the extraction process, images having the same sizes as those of the read image #1:161 and the like are extracted. However, an overlapping region is made to be included in both divided images adjacent to each other. Further, blank spaces (blank spaces 970, 972, 974 and 976) having the same sizes (horizontal widths) as the sizes (horizontal widths) after the skew correction is performed, illustrated in the example of FIG. 7, are inserted between the respective divided images (output divided images 960, 962, 964, 966 and 968).

In step S312, the comparison/collation module 180 compares and collates the printing image 172 and the read image 174 which are converted images, with each other, so as to detect a defect occurrence region.

Here, the defect detection may be performed as follows.

1) At least one of the printing image 172 and the read image 174 is divided so that plural block images are extracted, and a difference absolute value of both of the images is calculated for each pixel on an image different from the image from which the block images are extracted while changing a position of the block image in a predefined search range between the printing image 172 and the read image 174.

2) A position where a sum of the difference absolute values is the minimum is searched for in the block, and a difference image is generated.

3) A defect is detected from the difference image. For example, a portion in which a pixel value of the difference image is greater than, or equal to or greater than a predefined threshold value, is detected as a result thereof.

In step S314, the collation result 185 is output.

The process in step S312 will be described in detail by using a second exemplary embodiment. The comparison/collation module 180 performs processes of a data collection/position estimation module 1140, a block movement amount calculation module 1150, and a comparison/collation module 1160 described in the following example. The same portions as in the above-described exemplary embodiment are given the same reference numerals, and repeated description will be omitted. A reading module 1130 corresponds to the reading module 160. In addition, the printing image 115 corresponds to the printing image 172, and a read image 1135 corresponds to the read image 174. In other words, the comparison/collation module 180 in the first exemplary embodiment performs a process equivalent to the process on the printing image 115 and the read image 1135 in the second exemplary embodiment, since each of the printing image 172 and the read image 174 is processed as a single image.

Figure 11:
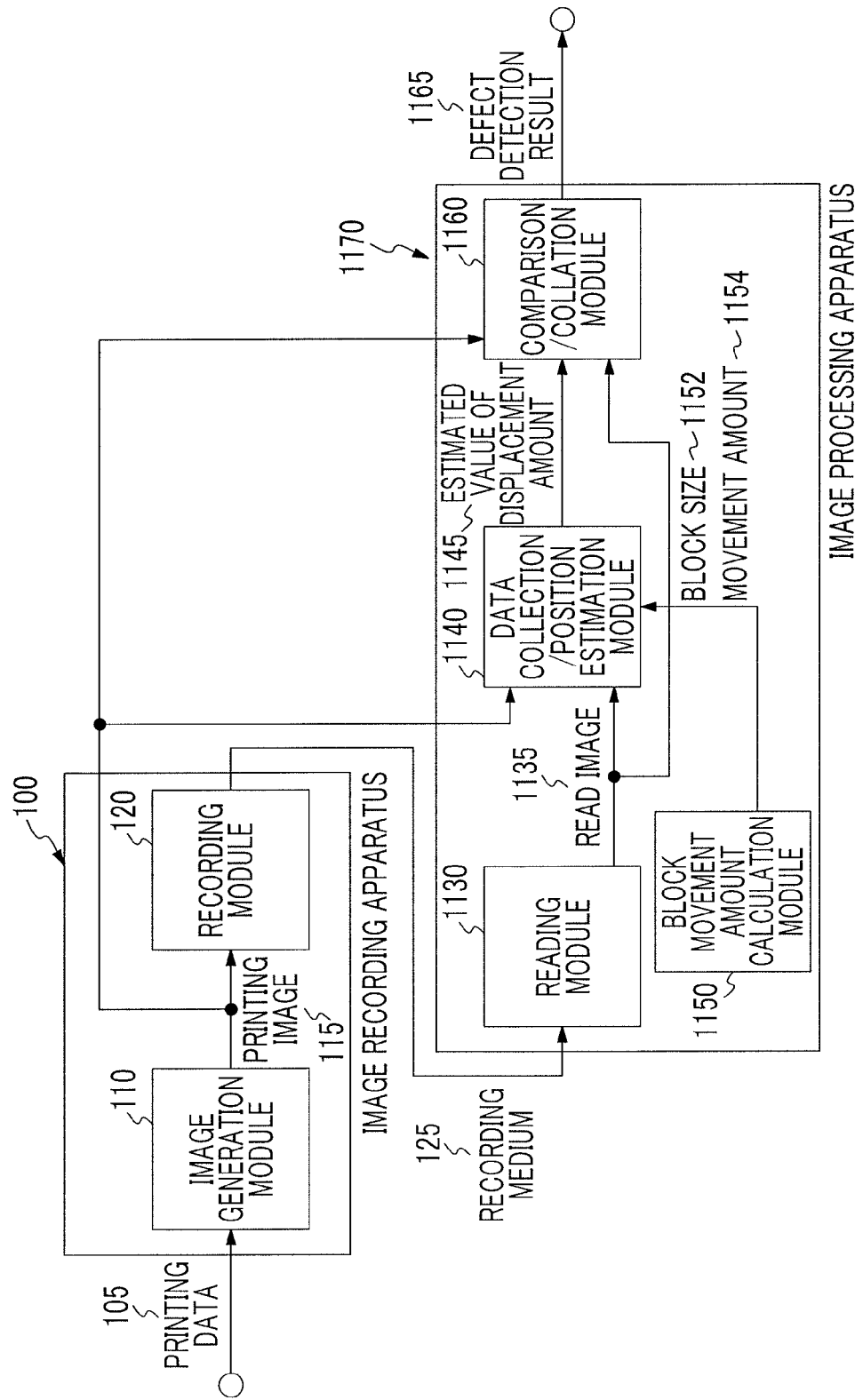
FIG. 11 is a conceptual module configuration diagram illustrating a configuration example according to a second exemplary embodiment.

The entire image processing system including an image processing apparatus according to the second exemplary embodiment compares image data with read data, and includes the image recording apparatus 100 and an image processing apparatus 1170 as illustrated in an example of FIG. 11. The image recording apparatus 100 includes the image generation module 110 and the recording module 120, and the image processing apparatus 1170 includes the reading module 1130, the data collection/position estimation module 1140, the block movement amount calculation module 1150, and the comparison/collation module 1160.

The reading module 1130 is connected to the data collection/position estimation module 1140 and the comparison/collation module 1160. The reading module 1130 converts the printing image 115 on the recording medium 125 into the read image 1135 using photoelectric conversion or the like. In other words, the read image 1135 which obtained by reading the recording medium 125 is generated. This is a so-called scanning process, and the reading module 1130 is implemented by a scanner which is an image reading device. The read image 1135 is sent to the data collection/position estimation module 1140 and the comparison/collation module 1160.

The data collection/position estimation module 1140 is connected to the image generation module 110, the reading module 1130, the block movement amount calculation module 1150, and the comparison/collation module 1160. The data collection/position estimation module 1140 sets a search range which is calculated based on an error, and searches for a position which a selected block image matches in one of the printing image 115 and the read image 1135 in relation to a block image extracted from the other. The searched position (an estimated value 1145 of a displacement amount) is sent to the comparison/collation module 1160. The comparison/collation module 1160 compares and collates the block image with the other image by overlapping the two images at the searched position, so as to detect a defect occurrence region.

A position estimation of a block image in the data collection/position estimation module 1140 may be performed as follows without first performing position search regarding all block images.

Figure 21:
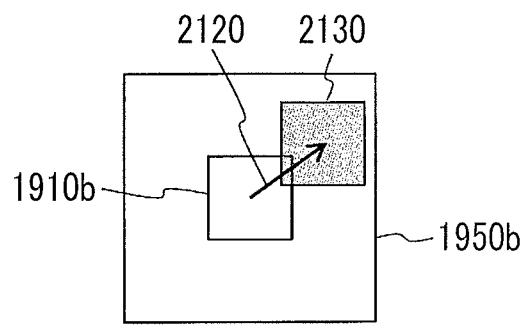
FIG. 21 a diagram illustrating a process example in a comparison/collation module.

First, a search process will be described. This process shows an example of the process in step S312 according to the first exemplary embodiment. Description thereof will be made with reference to FIG. 21. FIG. 21 is a diagram illustrating a process example in the comparison/collation module 1160. A block image 1910*a* of a reference image 1900*a* is shifted by one pixel in a search range 1950*b* of a read image 1900*b*, so that template matching (for example, an EOR process) is performed. In addition, as a result of the template matching, a relative position to a block image in which the maximum score (for example, as a score, an inverse number of a difference absolute value) indicating the most proximity in the search range 1950*b* is set as a displacement amount 2120. In other words, one in the block image 1910*b* corresponding to the block image 1910*a* is a block image 1901*b*, and in a case where a block image 2130 is extracted at the maximum score position as a result of performing template matching between the block image in the search range 1950*b* and the block image 1910*a*, the displacement amount 2120 is set. In addition, the comparison/collation module 1160 receives the estimated value 1145 of the displacement amount from the data collection/position estimation module 1140, and searches for a target block. Further, estimation of a plane is not necessarily performed in the template matching (of course, as will be described later, a plane estimation process may be performed for the template matching).

Hereinafter, a detailed description of a process example according to the second exemplary embodiment will be described.

The data collection/position estimation module 1140 selects at least one of block images extracted from one of the printing image 115 and the read image 1135, sets a search range calculated based on an error, and searches for a position which the selected block image matches in other image. Then, a corresponding position of an unselected block image in the other image is estimated based on the corresponding position of the selected block image matching in the other image. In addition, the estimated position (the estimated value 1145 of the displacement amount) is sent to the comparison/collation module 1160.

Figures 13A, 13B, 13C:
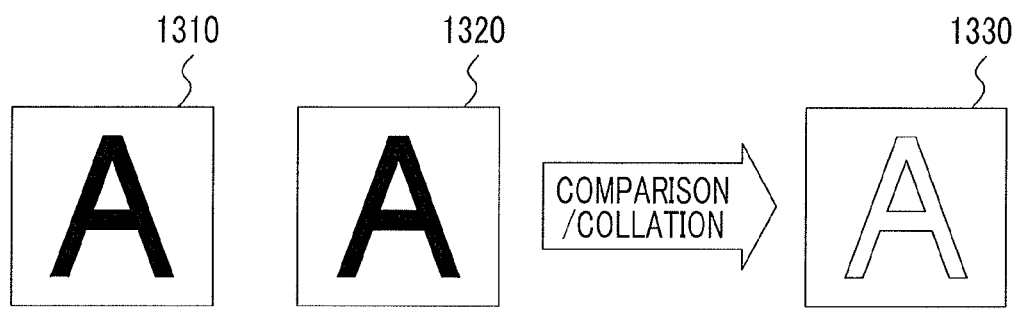
FIGS. 13A to 13C are diagrams illustrating a process example in a data collection/position estimation module.
Figure 14:
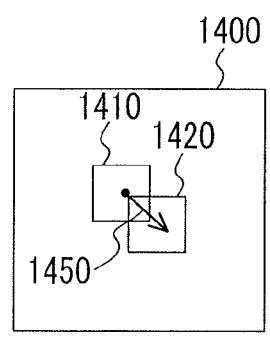
FIG. 14 is a diagram illustrating a process example in the data collection/position estimation module.

First, with reference to FIGS. 13A to 14, a description will be made of a process of estimating a corresponding position of a block image in the other image. FIGS. 13A to 13C are diagrams illustrating a process example in the data collection/position estimation module 1140.

1) As illustrated in examples of FIGS. 13A and 13B, the printing image 115 and the read image 1135 are respectively divided into rectangular shapes (hereinafter, referred to as blocks), so as to generate a printing block image 1310 and a read block image 1320. In other words, images of the printing image 115 and the read image 1135 are divided into blocks which are generated based on errors which may occur in the recording module 120 or the reading module 1130, and thus block images are extracted. In addition, as a block size here, a block size 1152 which is calculated by the block movement amount calculation module 1150 is used.

More specifically, the following process is performed.

One of the printing image 115 and the read image 1135 is divided into a rectangular shape which is generated based on errors which may occur in the recording module 120 or the reading module 1130, and thus a rectangular image is extracted. One image may be the printing image 115 or the read image 1135. Hereinafter, a description will be mainly made assuming that the printing image 115 is used as one image, and the read image 1135 is used as the other image. The block division will be described with reference to FIGS. 19A and 19B. FIGS. 19A and 19B are diagrams illustrating a process example according to the second exemplary embodiment. In the example of FIG. 19A, the reference image 1900*a* is divided into 9×12 blocks. Of course, a division number differ depending on a block size and a size of the reference image 1900*a*. In addition, the division number is not necessarily an integer number depending on a relationship between the block size and the size of the reference image 1900*a*, and a white image or the like may be added to a portion which does not form a single block. Further, the block division is performed based on the block size 1152 received from the block movement amount calculation module 1150.

Figure 20:
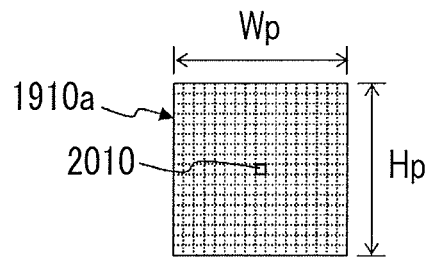
FIG. 20 is a diagram illustrating a block example.

FIG. 20 is a diagram illustrating a block example, and enlarges and displays the block image 1910*a* illustrated in the example of FIG. 19A. The block image 1910*a* has a size of Wp×Hp. In addition, coordinates of a central pixel 2010 of the block image 1910*a* are set to (Cx,Cy).

2) As illustrated in the example of FIG. 13C, at least one set of extracted block images is selected, and a difference absolute value of both of the images is calculated for each pixel in blocks (the printing image 115 and the read image 1135) at a corresponding position. For example, an exclusive OR (EOR) process may be performed for each pixel.

3) A position where a sum of the difference absolute values (a sum total of the difference absolute values in the respective pixels in the block) in the block is the minimum is searched for. In addition, a search range A here may or not be the same as the estimated value 1145 of the displacement amount used in the comparison/collation module 1160. The search range may be defined based on a movement amount 1154 calculated by the block movement amount calculation module 1150, and may be a search range which will be described later with reference to FIGS. 16A to 16C.

In the examples of FIGS. 13A to 13C, the printing block image 1310 is searched for in the read block image 1320. In other words, the printing block image 1310 and the read block image 1320 are shift in the search range A, and a sum of the difference absolute values in a positional relationship thereof is calculated. A positional relationship between rectangular images in which the calculated sum of the difference absolute values is the minimum is specified. As illustrated in an example of FIG. 14, a printing block image 1410 is searched for regarding a read block image 1420 in a read image 1400. A position 1450 where a sum of the difference absolute values is the minimum is obtained in the search range A. The position 1450 corresponds to, for example, differences (Δx,Δy) between central coordinates of the printing block image 1410 and the read block image 1420. Here, an example has been described in which the printing block image 1310 is searched for in the read block image 1320, but the read block image 1320 may be searched for in the printing block image 1310. In the present exemplary embodiment, both the printing image and the read image are cut out as blocks, but only the printing image may be cut out as a block image, a search range may be directly set in the other read image, and a position where a sum of difference absolute values is the minimum may be searched for in a range thereof in the same manner. In addition, only the read image may be cut out as a block image, a search range may be directly set in the other printing image, and a position where a sum of difference absolute values is the minimum may be searched for in a range thereof in the same manner.

In the present exemplary embodiment, the search range A is calculated as follows.

A range of a movement amount for defining the search range A is determined based on errors which may occur in the recording module 120 which forms an image of the printing image 115 on the recording medium 125 or the reading module 1130 which reads the recording medium 125, and an image (which may be either the printing image 115 or the read image 1135). The "errors which may occur in the recording module 120 or the reading module 1130" will be described later in description of the block movement amount calculation module 1150. For example, the data collection/position estimation module 1140 increases a movement amount according to a distance from an origin in the printing image 115 or the read image 1135, and calculates a movement amount at the most distant point from the origin so that a movement amount having undergone affine transform which is an error which may occur in the recording module 120 or the reading module 1130 becomes the maximum in a size of the printing image 115 or the read image 1135. The distance from the origin is the same value as a value of a position of the block. The origin of the printing image 115 or the read image 1135 is a position where the occurrence of an error in the recording module 120 or the reading module 1130 is the minimum, and indicates, for example, coordinates of an upper left corner of the image. The "most distant point from the origin" is a position which is the most distant from the origin. The position which is the most distant from the origin is a position where the occurrence of an error in the recording module 120 or the reading module 1130 is the maximum, and indicates, for example, coordinates of a lower right corner of the image. Specifically, the data collection/position estimation module 1140 increases a size of the search range A in a direction from the coordinates of the upper left corner to the lower right corner. The maximum size thereof is defined based on the maximum value of an "error which may occur in the recording module 120 or the reading module 1130", and is a movement amount 1154 calculated by the block movement amount calculation module 1150.

A description thereof will be made by using an example of FIGS. 16A to 16C. FIGS. 16A to 16C are diagrams illustrating an example of a size of the search range A based on a position inside an image. FIG. 16A illustrates an example of positions of an origin 1610 (upper left corner) of an image 1600 and the most distant point 1690 (lower right corner). In addition, FIG. 16B illustrates an example of a relationship between a block 1612 and a search range A 1614 at the origin 1610. The search range A 1614 is larger than the block 1612 by a predefined value (0 or greater). FIG. 16C illustrates an example of a relationship between a block 1692 and a search range A 1694 at the most distant point 1690. The search range A 1694 has a size defined based on the movement amount 1154 calculated by the block movement amount calculation module 1150. Further, sizes of the block 1612 and the block 1692 are the same as each other, and are the block size 1152 calculated by the block movement amount calculation module 1150. Here, an example in which the upper left corner is set as the origin, and the lower right corner is set as the most distant point, but any one of four points (the lower right corner, the upper right corner, the lower left corner, and the upper left corner) may be used depending on properties of errors which may occur in the recording module 120 or the reading module 1130. Here, as the examples, cases have been described in which rotation of the recording module 120 or the reading module 1130 occurs centering on the upper left corner, and an effect of enlargement or reduction becomes greater as a point becomes farther from the upper left corner.

Next, the data collection/position estimation module 1140 searches for a corresponding position of the extracted rectangular image in the other image in the search range A, by using the position 1450 at which the sum of the difference absolute values is the minimum in the search range A as a reference. For example, FIG. 19B illustrates an example of searching for the block image 1910*a* illustrated in FIG. 19A. As illustrated in FIG. 19B, the block image 1910*a* is searched for in the search range 1950*b* which is a "range of a movement amount" inside the read image 1900*b*. In addition, one corresponding to the block image 1910a in the reference image 1900a is a block image 1910b in the read image 1900b. Ideally (in a case where errors which may occur in the recording module 120 and the reading module 1130 are 0), in order to detect a defect, the block image 1910a and the block image 1910b have only to be compared with each other, but, actually, since errors occur in the recording module 120 and the reading module 1130, the search is made in the search range 1950b (a search range determined by the data collection/position estimation module 1140) which is determined in consideration of the actual errors. Consequently, the entire read image 1900b is not required to be searched for, and a position which matches the block image 1910a in the read image 1900b may be found. The search range is a region which includes a rectangular shape of the other image at the same position as the rectangular position in one image and is formed by vertical and horizontal movement amounts with respect to the rectangular shape.

The search process is as described with reference to FIG. 21. The example illustrated in FIG. 21 displays the search range 1950b illustrated in the example of FIG. 19B in an enlarged manner.

A block in which there may be plural positions where a sum of difference absolute values is the minimum is excluded in advance as a source for estimating positions of unselected other blocks described later.

For example, there are a block (which may include a case where a whole pixel value difference is equal to or smaller than a predefined value even if the block is painted with exactly the same color) which is painted with the same color (for example, white, black, or transparent) as a whole, a block in which only a single straight line is drawn, a block in which only plural parallel lines are drawn, and a block in which plural regular graphics (substantially the same graphics) are drawn. Since it is not possible to uniquely determine a corresponding position in these blocks, it is not possible to estimate a position of an unselected block, or even if a position may be estimated, an error may increase, and thus the blocks are not suitable for estimating a position.

The time at which it is determined that these blocks are excluded may be when a block is selected, and may be when a position of another image is estimated after a block is selected and then a corresponding position is searched, but if the blocks are excluded when a block is selected, it is possible to reduce a calculation amount required for an unnecessary search.

In a case where a distance between rectangular images in which a sum of difference absolute values is the minimum is greater than or equal to a predefined value as a result in which a block is selected and a search is made, a positional relationship between the blocks is excluded as a source for estimating positions of unselected other blocks.

Next, a description will be made of estimation of a corresponding position of a block image which is not selected by the data collection/position estimation module 1140 in the other image, with reference to FIGS. 15A to 15C. FIGS. 15A to 15C are diagrams illustrating a process example in the data collection/position estimation module 1140. As illustrated in an example of FIG. 15A, a position where a sum of difference absolute values is the minimum in blocks (blocks with the diagonal lines in FIG. 15A) of a printing image 1510 is calculated. In addition, excluded blocks (white blocks in FIG. 15A) are not used for a position estimation process. The data collection/position estimation module 1140 calculates a plane (which may be a "plane in a characteristic space") defined by a position between block images, and estimates positions of unselected block images based on the plane.

Specifically, a plane indicating a displacement amount is calculated from the position where the sum of difference absolute values is the minimum, and a displacement amount is calculated according to a position of each block.

In other words, the following process is performed. A position ($\Delta x, \Delta y$) of the block image is plotted in the characteristic space. As the characteristic space, for example, there is a three-dimensional space which has an x axis, a y axis, and $\Delta x$ or $\Delta y$ as an axis. Here, the x axis and the y axis are axes representing coordinates of a center of the block. The characteristic space may be a four-dimensional space which has an x axis, a y axis, a $\Delta x$ axis, and a $\Delta y$ axis, and may be other spaces as long as an axis representing $\Delta x$ or $\Delta y$ is included. A plane formed through the plotting is calculated. For example, the plane is a plane 1520 representing a displacement amount ($\Delta x$) in the example of FIG. 15A, and is a plane 1530 representing a displacement amount ($\Delta y$) in the example of FIG. 15B. Of course, all positions are not required to be plotted in a plane, and a plane estimated through the plotting may be calculated by using an existing method.

It is possible to estimate displacement amounts in all blocks in an image by using the plane representing the displacement amounts. Specifically, a position of each block is assigned to an equation ($\Delta x = a_1 x + b_1 y + c_1$, $\Delta y = a_2 x + b_2 y + c_2$) representing the plane, and a displacement amount in each block is estimated.

In relation to estimation of a displacement amount here, at least an unselected block image is required to be targeted. In a case where this process is sequentially performed, when only an unselected block image is targeted, a calculation amount of the displacement amount estimation is further reduced than when all block images are targeted, and thus the process may be performed at a high speed. In a case where the displacement amount estimation is performed in parallel processes by using a multicore CPU, GPU or the like, the process may be performed at a higher speed when the process is uniformly applied to all block images than when a step of determining whether or not a block image is a selection target is added.

Next, the data collection/position estimation module 1140 searches for a corresponding position in the other image for each block image based on the displacement amount estimated by using the above-described method. In other words, a search range is set by using the estimated displacement amount as a reference position, template matching is performed, and a position indicating the most proximity in the search range is searched for. The template matching here may employ the same method as the above-described template matching.

A search target here is at least an unselected block image. In a case where this process is sequentially performed, when only an unselected block image is targeted, a calculation amount of the displacement amount estimation is further reduced than when all block images are targeted, and thus the process may be performed at a high speed. In a case where the second position search is performed in parallel processes by using a multicore CPU, GPU or the like, the process may be performed at a higher speed when the process is uniformly applied to all block images than when a step of determining whether or not a block image is a selection target is added.

The search range here may be determined in the same manner as in the above-described method of determining a search range, but a position has already been estimated for an unselected block image, and thus a range smaller than that may be set as the search range. A calculation amount required for difference extraction is further reduced than in a case of using the same search range.

The comparison/collation module 1160 is connected to the image generation module 110, the reading module 1130, and the data collection/position estimation module 1140. The comparison/collation module 1160 compares and collates the printing image 115 with the read image 1135 so as to detect the presence or absence of a defect and a defect occurrence region. The comparison/collation module 1160 receives the printing image 115 and the read image 1135. The read image 1135 reads the recording medium 125 on which an image of the printing image 115 is formed. In other words, the comparison/collation module 1160 receives the printing image 115 which is a source of a print-out target, and the read image 1135 which is obtained by printing out the printing image 115 and scanning the printed-out recording medium 125. This is because the presence or absence of a defect which occurs in the recording module 120 or the reading module 1130 is checked. Here, the defect indicates noise, and, ideally, the printing image 115 completely matches the read image 1135. However, a defect occurs due to maintenance statuses of the recording module 120 and the reading module 1130. In addition, an error may occur in the recording module 120 and the reading module 1130. Here, the "error which may occur" is an error which is allowable in design specifications of the recording module 120 and the reading module 1130. As the error, specifically, there are enlargement or reduction, rotation, and affine transform of movement. In a case where a design specification is realized (a design goal is achieved) in which, for example, rotation of x degrees or larger does not occur, rotation of below x degrees may occur.

Therefore, the comparison/collation module 1160 extracts a defect (for example, a mixture of three or more black pixels) from which an error which may occur in the recording module 120 and the reading module 1130 is excluded. In other words, it is checked whether or not a defect other than an allowable error in the design specification, and a position where the defect occurs is specified to be usefully used for maintenance of the recording module 120 and the reading module 1130.

Next, the comparison/collation module 1160 receives a search result from the data collection/position estimation module 1140, and compares an extracted rectangular image with an image (an image of the search result) of a portion to which the extracted rectangular image corresponds in the other image. In other words, both of the images overlap each other at a position where the rectangular image of the printing image side and the rectangular image of the read image side match each other most, and comparison for extracting a difference therebetween is performed. The "search result" is a result in which a position where both of the images match each other most is extracted by comparing the rectangular image in one image within a search range of the other image. The difference between the position and the position of the rectangular image may be used as a displacement amount. The search result may be used for the "comparison". In other words, the search result is obtained in a case where the most matching occurs, and thus a matching degree may be used as a defect detection result 1165. In addition, the defect detection result 1165 may include not only the matching degree but also a displacement amount.

A description thereof will be made with reference to FIGS. 17A to 17C. FIGS. 17A to 17C are diagrams illustrating a defect detection process example in the comparison/collation module 1160. A printing block image 1710 illustrated in an example of FIG. 17A is a block image in the printing image 115; a read block image 1720 illustrated in an example of FIG. 17B is a block image in the read image 1135; and a difference block image 1730 illustrated in an example of in FIG. 17C indicates a difference (a result of an EOR process) between the printing block image 1710 and the read block image 1720. The comparison/collation module 1160 generates a difference image for each block, and detects a defect in the difference image. As the defect, for example, a defect may be detected in which a size of one side of a circumscribed rectangle is a size within a predefined range (for example, three pixels to five pixels).

The block movement amount calculation module 1150 is connected to the data collection/position estimation module 1140. The block movement amount calculation module 1150 calculates the block size 1152 and the movement amount 1154 based on the error which may occur in the recording module 120 or the reading module 1130. The block size 1152 and the movement amount 1154 are sent to the data collection/position estimation module 1140. The error in the recording module 120 or the reading module 1130 includes affine transform in the image forming apparatus or the image reading apparatus. Specific examples of the error include an enlargement or reduction ratio or a rotation angle. The process in the block movement amount calculation module 1150 may be performed before the data collection/position estimation module 1140 performs a process, and the block size 1152 and the movement amount 1154 may be calculated in advance and be stored in the data collection/position estimation module 1140. Further, in order to correspond to the recording module 120 and the reading module 1130 used at that time, the block size 1152 and the movement amount 1154 may be calculated whenever errors are received from the recording module 120 and the reading module 1130.

The block size 1152 is defined through affine transform so that a pixel deviation between a rectangular image of one image and a rectangular image of the other image is smaller than one pixel. In addition, calculation of the block size 1152 will be described later by using an example of FIG. 23.

The movement amount 1154 calculated by the block movement amount calculation module 1150 is defined so that a movement amount obtained by affine transform is the maximum in a size of the printing image 115 or the read image 1135. The movement amount 1154 is used to form the search range 1950b.

Figure 22:
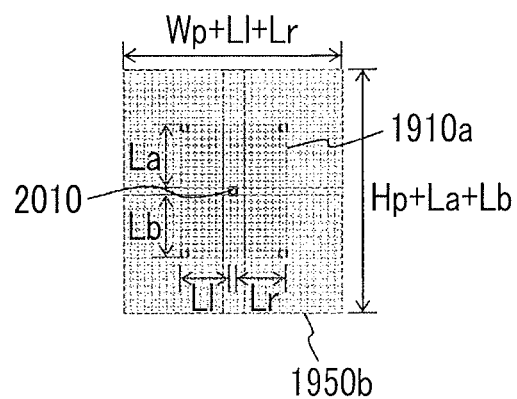
FIG. 22 is a diagram illustrating an example of a relationship between a block image and a search range.

FIG. 22 is a diagram illustrating a relationship example between the block image 1910a and the search range 1950b. The movement amount 1154 includes, specifically, an upward movement amount, a downward movement amount, a left movement amount, and a right movement amount.

A height (block height) of the block image 1910a is $L_a+1+L_b$, and is $H_p$ illustrated in the example of FIG. 20.

A width (block width) of the block image 1910a is $L_1+1+L_r$, and is $W_p$ illustrated in the example of FIG. 20.

A height (search range height) of the search range 1950b is $H_p+L_a+L_b$. $L_a$ indicates an upward movement amount. $L_b$ indicates a downward movement amount.

A width (search range width) of the search range 1950b is $W_p+L_1+L_r$. $L_1$ indicates a left movement amount. $L_r$ indicates a right movement amount.

Figure 24:
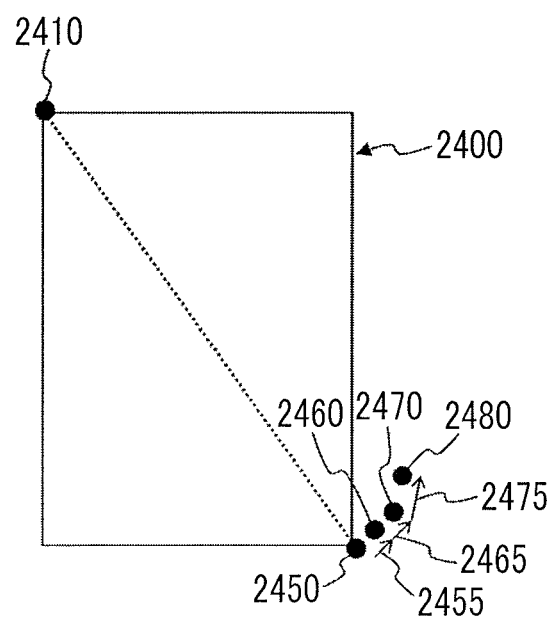
FIG. 24 is a diagram illustrating a process example of calculating a movement amount.
Figure 25:
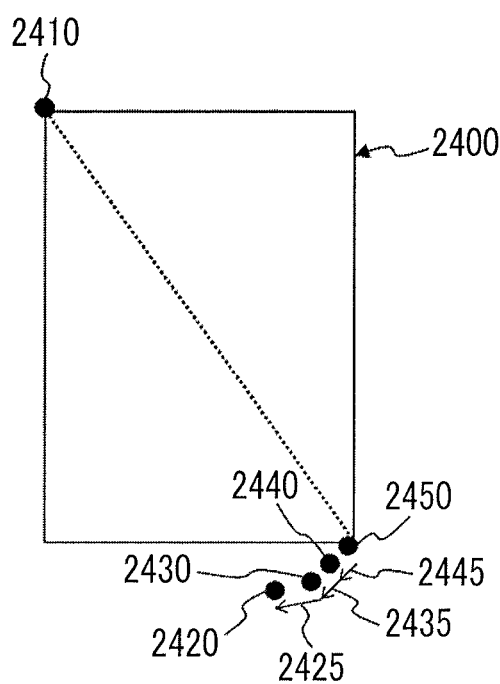
FIG. 25 is a diagram illustrating a process example of calculating a movement amount.

In addition, calculation of the movement amount 1154 will be described later by using examples of FIGS. 24 and 25.

The movement amount 1154 indicates the maximum value of a search range in the image, and the data collection/position estimation module 1140 determines the estimated value 1145 of a displacement amount based on a position of the block in the image by using the movement amount 1154.

All process examples according to the second exemplary embodiment will be described.

First, the image generation module 110 performs image conversion on the printing data 105 so as to generate the printing image 115.

Next, the recording module 120 records the printing image 115 on the recording medium 125.

Next, the reading module 1130 reads the recording medium 125 on which the printing image 115 is recorded. The read result is the read image 1135.

Next, the data collection/position estimation module 1140 collects data items (specifically, differences between block images) for determining the estimated value 1145 of a displacement amount.

Next, the data collection/position estimation module 1140 estimates a displacement amount for each block.

Next, the comparison/collation module 1160 compares and collates the converted image (printing image 115) with the read image 1135 so as to detect a defect occurrence region.

Figure 12:
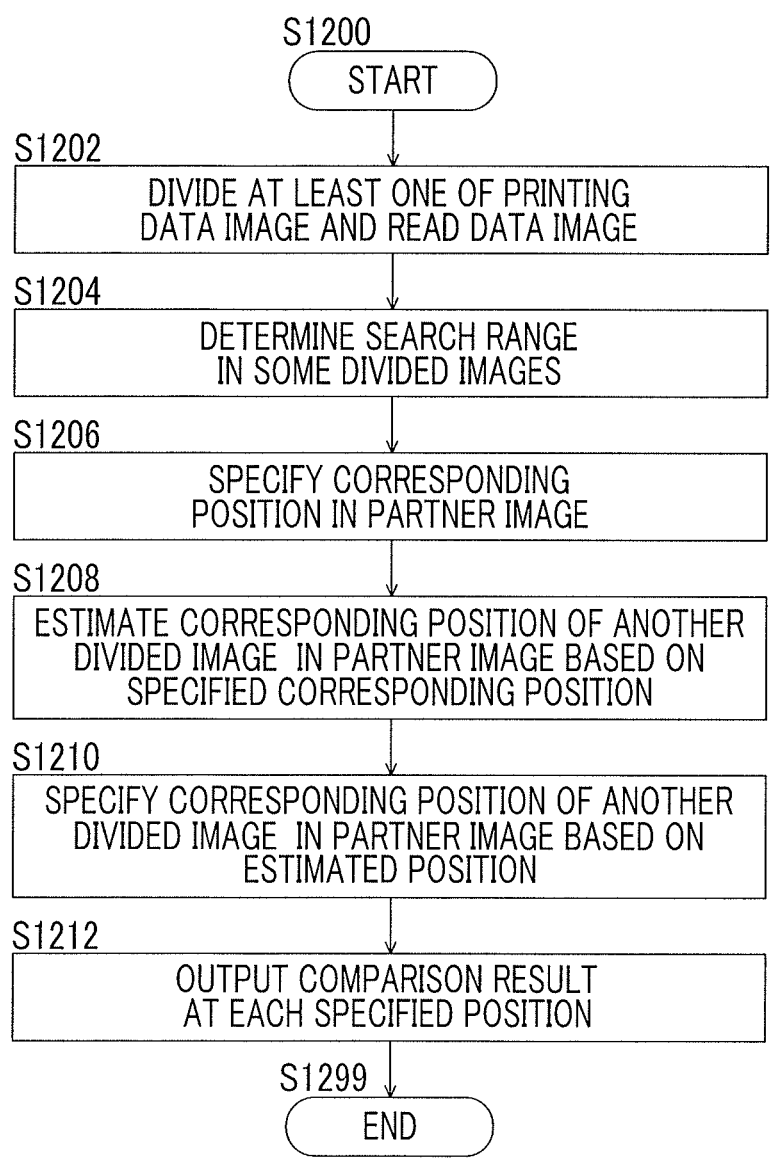
FIG. 12 is a flowchart illustrating a processing example according to the second exemplary embodiment.

FIG. 12 is a flowchart illustrating a process example according to the second exemplary embodiment.

In step S1202, at least one of a printing data image and a read data image is divided. As a division method here, the image is divided in a size which is calculated by using an error (for example, the size becomes smaller as the error increases).

In step S1204, a search range is determined in some divided images. The determination of the search range here is performed in a size which is calculated by using an error (for example, the size becomes larger as the error increases).

In step S1206, a corresponding position in a partner image is specified. Specifically, the divided image overlaps the other image so that a difference is obtained for each pixel, absolute values of differences are added together while changing a position of the image in the search range, and a position where the difference is smallest is set as a corresponding position.

In step S1208, a corresponding position of another divided image in the partner image is estimated based on specified corresponding position. Specifically, a deviation amount between the corresponding position and an initial position is plotted in a plane, and a deviation amount of another divided image is estimated based on the plane and a position relative to the division source image of the divided image.

In step S1210, a corresponding position of another divided image in the partner image is specified based on the estimated position. A search range here may be the same as the search range in step S1204, but may be a second search range narrower than the search range determined in step S1204. This is because the searched divided image here is searched for from the position estimated in step S1208, and thus a corresponding position is located nearby. The second search range is applied, and thus a calculation amount which requires differences for specifying a position is reduced.

In step S1212, a comparison result at each specified position is output. The difference acquired when the position is specified may be output as a comparison result without change, and an image may be output after the image is further processed (for example, a difference is emphasized).

FIG. 18 is a flowchart illustrating a process example in which the block movement amount calculation module 1150 calculates the block size 1152 and the movement amount 1154.

In step S1802, an enlargement or reduction ratio and a rotation angle (skew angle) which may occur in the recording module 120 or the reading module 1130 are acquired.

In step S1804, a block size is calculated.

In step S1806, a movement amount is calculated.

In step S1808, the block size 1152 and the movement amount 1154 are sent to the data collection/position estimation module 1140 and the comparison/collation module 1160.

Figure 23:
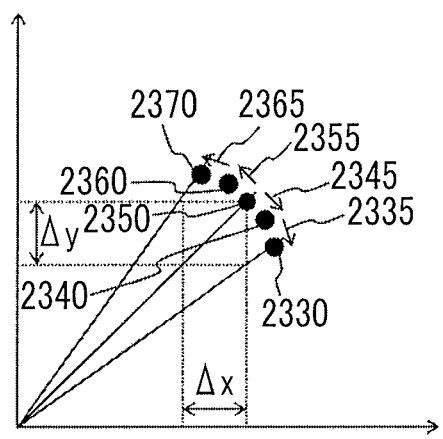
FIG. 23 is a diagram illustrating a process example of calculating a block size.

FIG. 23 is a diagram illustrating a process example of calculating the block size 1152. In a case where rotation, enlargement or reduction is generated in the worst state by the recording module 120 or the reading module 1130, a block size is set so that a pixel deviation is smaller than one pixel at each corner when centers of a block of the printing image 115 and a block of the read image 1135 match each other.

An example of FIG. 23 shows that a point 2350 in the printing image 115 is how deviated due to an error in the recording module 120 or the reading module 1130.

The point 2350 is moved to a point 2360 due to a movement (during the maximum reduction in both scanning directions) 2355 caused by enlargement or reduction. In addition, the point is moved to a point 2370 due to a movement (counterclockwise) 2365 caused by skew. This case corresponds to a case where the maximum reduction occurs (the point becomes smallest), and counterclockwise rotation is the maximum.

The point 2350 is moved to a point 2340 due to a movement (during the maximum enlargement in both scanning directions) 2345 caused by enlargement or reduction. In addition, the point is moved to a point 2330 due to a movement (clockwise) 2335 caused by skew. This case corresponds to a case where the maximum enlargement occurs (the point becomes largest), and clockwise rotation is the maximum.

(1) When the maximum reduction (x-axis direction magnification: $r_1$, and y axis direction magnification: $r_2$) and the maximum skew (counterclockwise, rotation angle: $\alpha$) occur in both of the scanning directions, a movement amount is calculated as in Equation (1) if a movement amount of a point on a diagonal line having the largest movement amount with a center of the block as an origin is set to (1,1).

$$\begin{bmatrix} \cos(\alpha) & -\sin(\alpha) \\ \sin(\alpha) & \cos(\alpha) \end{bmatrix} \begin{bmatrix} r_1 \\ r_2 \end{bmatrix} = \begin{bmatrix} x_1 \\ y_1 \end{bmatrix} \qquad \text{Equation (1)}$$

A difference $\Delta x$ of x at y=1 is calculated by using a straight line passing through the point 2370 and the original straight line. In the example of FIG. 23, the difference $\Delta x$ is defined by the point 2350, the origin, the straight line passing through the point 2370, and the straight line of y=1.

(2) On the other hand, when the maximum enlargement (x-axis direction magnification: $r_3$, and y axis direction magnification: $r_4$) and the maximum skew (clockwise, rotation angle: $\beta$) occur in both of the scanning directions, a movement amount is calculated as in Equation (2) if a movement amount of a point on a diagonal line having the largest movement amount with a center of the block as an origin is set to (1,1).

$$\begin{bmatrix} \cos(\beta) & \sin(\beta) \\ -\sin(\beta) & \cos(\beta) \end{bmatrix} \begin{bmatrix} r_3 \\ r_4 \end{bmatrix} = \begin{bmatrix} x_2 \\ y_2 \end{bmatrix} \qquad \text{Equation (2)}$$

A difference $\Delta y$ of y at x=1 is calculated by using a straight line passing through the point 2330 and the original straight line. In the example of FIG. 23, the difference $\Delta y$ is defined by the point 2350, the origin, the straight line passing through the point 2330, and the straight line of x=1.

(3) y' and x' which cause $\Delta x$ and $\Delta y$ to become 1.4 are calculated. In addition, when a width and a height of the block are respectively indicated by W and H, Equation (3) is given.

$$W=2*\text{ceil}(x')+1, H=2*\text{ceil}(y')+1 \qquad \text{Equation (3)}$$

Here, ceil( ) is a function which rounds up a decimal point or less.

Consequently, the block size 1152 (W and H of Equation (3)) may be calculated. For example, a width and a height of the block are respectively 100 pixels and 110 pixel.

Next, a description will be made of a process example of calculating the movement amount 1154 (a size of a search range) by using examples of FIGS. 24 and 25. The movement amount 1154 calculated here is a movement amount at the most distant point.

In a case where rotation, enlargement, reduction, and movement all occur in the worst case due to the recording module 120 or the reading module 1130, the movement amount 1154 is set so that a movement amount of a lower right corner in a certain paper size (for example, A3 elongation paper) is taken into consideration. In addition, the following coordinates have an upper left corner as an origin, a right direction and a lower direction as a positive direction, and a clockwise direction as a positive direction of a rotation angle.

Under a condition that a movement amount is the maximum in the upper right direction, with an upper left corner of a certain paper size as an origin, a movement amount of a lower right corner (for example, in the A3 elongation paper, coordinates (3897,5763) at 300 dpi) having the largest movement amount is calculated as in Equation (4).

$$M = M_{skew} + M_{size} + M_{shift} \quad \text{Equation (4)}$$

Here, $M_{skew}$ indicates a movement amount caused by skew, $M_{size}$ indicates a movement amount caused by enlargement or reduction, and $M_{shift}$ indicates a movement amount caused by shift.

Here, $M_{skew}$, $M_{size}$ and $M_{shift}$ are respectively given as in Equations (5), (6) and (7).

$$M_{skew} = \begin{cases} 3897 - \{3897 \times \cos(\gamma) - 5763 \times \sin(\gamma)\} = \\ \quad M_{askew} \text{ (pixel (main scanning direction))} \\ 5763 - \{3897 \times \sin(\gamma) + 5763 \times \cos(\gamma)\} = \\ \quad M_{bskew} \text{ (pixel (sub-scanning direction))} \end{cases} \quad \text{Equation (5)}$$

$$M_{size} = \quad \text{Equation (6)}$$
$$\begin{cases} 3897 \times r_5 - 3897 = M_{asize} \text{ (pixel (main scanning direction))} \\ 5763 \times r_6 - 5763 = M_{bsize} \text{ (pixel (sub-scanning direction))} \end{cases}$$

$$M_{shift} = \quad \text{Equation (7)}$$
$$\begin{cases} s_1 \div 25.4 \times 300 = M_{ashift} \text{ (pixel (main scanning direction))} \\ s_2 \div 25.4 \times 300 = M_{bshift} \text{ (pixel (sub-scanning direction))} \end{cases}$$

Here, $\gamma$ indicates a rotation angle, $r_5$ and $r_6$ indicate an enlargement or reduction ratio, and $s_1$ and $s_2$ indicate a movement amount.

Therefore, Equation (8) is obtained.

$$M = \quad \text{Equation (8)}$$
$$\begin{cases} M_{askew} + M_{asize} + M_{ashift} = M_a \text{ (pixel (main scanning direction))} \\ M_{bskew} + M_{bsize} + M_{bshift} = M_b \text{ (pixel (sub-scanning direction))} \end{cases}$$

A description will be made by using an example of FIG. 24. FIG. 24 is a diagram illustrating a process example of calculating a movement amount.

A point 2450 is moved to a point 2460 due to a movement (the maximum in the upper right direction) 2455 caused by shift. In addition, the point is moved to a point 2470 due to a movement (the maximum enlargement in the main scanning direction and the maximum reduction in the sub-scanning direction) 2465 caused by enlargement and reduction. Further, the point is moved to a point 2480 due to a movement (counterclockwise) 2475 caused by skew. In other words, the maximum movement amount in the upper direction and the right direction at the most distant point (the lower right corner) from an origin 2410 (in FIG. 24, the upper left corner) of an image 2400 is calculated.

On the other hand, under a condition that a movement amount in the lower left direction is the maximum, with an upper left corner of a certain paper size as an origin, a movement amount of a lower right corner (for example, A3 elongation paper) having the largest movement amount is calculated as in Equations (9), (10) and (11).

$$M_{skew} = \begin{cases} 3897 - \{3897 \times \cos(\theta) - 5763 \times \sin(\theta)\} = \\ \quad M_{cskew} \text{ (pixel (main scanning direction))} \\ 5763 - \{3897 \times \sin(\theta) + 5763 \times \cos(\theta)\} = \\ \quad M_{dskew} \text{ (pixel (sub-scanning direction))} \end{cases} \quad \text{Equation (9)}$$

$$M_{size} = \quad \text{Equation (10)}$$
$$\begin{cases} 3897 \times r_7 - 3897 = M_{csize} \text{ (pixel (main scanning direction))} \\ 5763 \times r_8 - 5763 = M_{dsize} \text{ (pixel (sub-scanning direction))} \end{cases}$$

$$M_{shift} = \quad \text{Equation (11)}$$
$$\begin{cases} s_3 \div 25.4 \times 300 = M_{cshift} \text{ (pixel (main scanning direction))} \\ s_4 \div 25.4 \times 300 = M_{dshift} \text{ (pixel (sub-scanning direction))} \end{cases}$$

Here, $\theta$ indicates a rotation angle, $r_7$ and $r_8$ indicate an enlargement or reduction ratio, and $s_3$ and $s_4$ indicate a movement amount.

Therefore, Equation (12) is obtained.

$$M = \quad \text{Equation (12)}$$
$$\begin{cases} M_{cskew} + M_{csize} + M_{cshift} = M_c \text{ (pixel (main scanning direction))} \\ M_{dskew} + M_{dsize} + M_{dshift} = M_d \text{ (pixel (sub-scanning direction))} \end{cases}$$

A description will be made by using an example of FIG. 25. FIG. 25 is a diagram illustrating a process example of calculating a movement amount.

The point 2450 is moved to a point 2440 due to a movement (the maximum in the lower left direction) 2445 caused by shift. In addition, the point is moved to a point 2430 due to a movement (the maximum reduction in the main scanning direction and the maximum enlargement in the sub-scanning direction) 2435 caused by enlargement and reduction. Further, the point is moved to a point 2420 due to a movement (counterclockwise) 2425 caused by skew. In other words, the maximum movement amount in the lower direction and the left direction at the most distant point (the lower right corner) from the origin 2410 (in FIG. 25, the upper left corner) of the image 2400 is calculated.

Based on the above description, the upward maximum value, the downward maximum value, the left maximum value, and the right maximum value of a movement amount may be calculated. For example, the upward maximum value, the downward maximum value, the left maximum value, and the right maximum value of a movement amount are respectively 67.41 pixels, 95.99 pixels, 58.73 pixels, and 62.47 pixels, and thus the upward, downward, left and right movement amounts of the block respectively become 68 pixels, 96 pixels, 59 pixels, and 63 pixels at minimum. In addition, actually, a movement amount is out of specifications (over specification) of the recording module 120 and the reading module 1130 and may thus be set to be larger by a predefined value. This value is a movement amount at the point 2450 which is the most distant point from the origin 2410. Movement amounts at positions other than the point 2450 (search range) may be determined by the data collection/position estimation module 1140 based on the positions and the movement amount at the point 2450.

With reference to FIG. 10, a hardware configuration example of the image processing apparatus of the present exemplary embodiment will be described. A configuration shown in FIG. 10 is implemented by, for example, a personal computer (PC) or the like, and is a hardware configuration example including a data reading unit 1017 such as a scanner and a data output unit 1018 such as a printer.

A central processing unit (CPU) 1001 is a controller which executes processes according to a computer program which describes execution sequences of the respective modules described in the above exemplary embodiment, that is, the reading module 160, the processing module 170, and the comparison/collation module 180.

A read only memory (ROM) 1002 stores programs, calculation parameters or the like used by the CPU 1001. A random access memory (RAM) 1003 stores programs used for execution of the CPU 1001 or parameters which are appropriately varied in the execution and the like. They are connected to each other via a host bus 1004 constituted by a CPU bus and the like.

The host bus 1004 is connected to an external bus 1006 such as a peripheral component interconnect/interface (PCI) bus via a bridge 1005.

A keyboard 1008 and a pointing device 1009 such as a mouse are input devices operated by an operator. A display 1010 includes a liquid crystal display, a cathode ray tube (CRT), or the like, and displays a variety of information pieces as text or image information.

An hard disk drive (HDD) 1011 has a hard disk built therein, drives the hard disk, and records or reproduces a program or information executed by the CPU 1001. The hard disk stores the printing image 115, the read image #1:161, the collation result 185, and the like. In addition, a variety of computer programs such as various other data processing programs are stored therein.

A drive 1012 reads data or a program recorded on a removable recording medium 1013 such as a magnetic disk, an optical disc, a magneto-optical disc, or a semiconductor memory which is installed therein, and supplies the data and the program to the RAM 1003 which is connected thereto via an interface 1007, the external bus 1006, the bridge 1005, and the host bus 1004. The removable recording medium 1013 may be also used as a data recording region in the same manner as the hard disk.

A connection port 1014 is a port for connection to an external connection apparatus 1015 and has a connection unit such as a USB, or IEEE1394. The connection port 1014 is connected to the CPU 1001 and the like via the interface 1007, the external bus 1006, the bridge 1005, the host bus 1004 and the like. A communication unit 1016 is connected to a communication line and executes a data communication process with external apparatuses. The data reading unit 1017 is, for example, a scanner, and executes a document reading process. The data output unit 1018 is, for example, a printer, and executes a document data output process.

In addition, the hardware configuration of the image processing apparatus illustrated in FIG. 10 shows a configuration example, and the present exemplary embodiment is not limited to the configuration illustrated in FIG. 10 and may employ a configuration which may execute the modules described in the present exemplary embodiment. For example, some modules may be constituted by dedicated hardware (for example, an application specific integrated circuit (ASIC)), some modules may have a form where they exist in an external system and are connected via a communication line, and plural systems illustrated in FIG. 10 may be connected to each other via a communication line and be operated in cooperation with each other. In addition, the hardware configuration may be incorporated into a copier, a facsimile, a scanner, a printer, a multi-function peripheral (an image processing apparatus having two or more functions of the scanner, the printer, the copier, and the facsimile), or the like.

In addition, the above-described program may be stored on a recording medium, or the program may be provided using a communication unit. In this case, for example, the above-described program may be understood as the invention of a "computer readable recording medium recording the program".

The "computer readable recording medium recording the program" refers to a recording medium which is used to install and execute the program and distribute the program, records the program thereon and is capable of being read by a computer.

In addition, the recording medium includes, for example, "DVD-R, DVD-RW, DVD-RAM, or the like" which is a digital versatile disc (DVD) and is a standard formulated by the DVD forum, "DVD+R, DVD+RW, or the like" which is a standard formulated by DVD+RW, a read only memory (CD-ROM), a CD-recordable (CD-R), a CD-rewritable (CD-RW), or the like as a compact disc (CD), a Blu-ray disc (registered trademark), a magneto-optical disc (MO), a flexible disc (FD), a magnetic tape, a hard disk, a read only memory (ROM), an electrically erasable and rewritable programmable read-only memory (EEPROM (registered trademark)), a flash memory, a random access memory (RAM), a secure digital (SD) memory card, or the like.

The above-described program or a part thereof may be recorded on the recording medium so as to be reserved or distributed, for example. In addition, the program may be transmitted by communication, for example, wired networks such as a local area network (LAN), a metropolitan area network (MAN), a wide area network (WAN), the Internet, an intranet, and an extranet, or wireless communication networks. Further, the program may be transmitted using a combination of the recording media, or may be carried on a carrier.

Further, the above-described program may be a part of another program, or may be recorded on the recording medium along with a separate program. In addition, the program may be recorded on plural recording media so as to be divided. The program may be recorded in any form as long as the program may be recovered through compression, encoding, or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a correction unit configured to correct a tilt of each partial image data generated using a plurality of sensors reading a medium on which an image is formed using image data so that at least part of a reading region of each one of the plurality of sensors overlaps a reading region of an adjacent one of the plurality of sensors;
   an extraction unit configured to extract extracted image data, from the image data,
      wherein the extracted image data is extracted based on a position and a size at which the image data matches counterparts from the partial image data;
   a comparison unit configured to compare partial image data corrected by the correction unit with the extracted image data extracted by the extraction unit; and
   an insertion unit configured to insert a first blank space between the partial image data adjacent to each other so as to correct a tilt of the partial image data;
   a generation unit configured to generate combined image data by combining the partial image data and the first blank space,
   wherein the insertion unit is further configured to insert a second blank space having a size determined based on the first blank space and the tilt of the partial image data, between the extracted image data adjacent to each other, and
   wherein the comparison unit is configured to compare the combined image data with image data into which the second blank space is inserted by the insertion unit.

2. The image processing apparatus according to claim 1, wherein the insertion unit is configured to insert the first blank space having a width which is set so that overlapping does not occur in a longitudinal direction of the partial image data after a tilt of the partial image data is corrected.

3. The image processing apparatus according to claim 1, wherein the comparison unit is configured to divide one of the combined image data and the image data into which the second blank space is inserted by the insertion unit into a plurality of rectangular images, search for corresponding positions of the plurality of rectangular images in another image, and compare the respective rectangular images with the another image at the searched corresponding positions,
   wherein the insertion unit is configured to insert the first blank having a width which is set so that a width of the partial image data corrected by the correction unit and the first blank space is an integer multiple of a width of the plurality of rectangular images, and
   wherein the insertion unit is configured to insert the second blank space having a width which is set so that a width of the extracted image data and the second blank space is an integer multiple of a width of the plurality of rectangular images.

4. The image processing apparatus according to claim 2,
   wherein the comparison unit is configured to divide one of the combined image data and the image data into which the second blank space is inserted by the insertion unit into a plurality of rectangular images, search for corresponding positions of the plurality of rectangular images in another image, and compare the respective rectangular images with the another image at the searched corresponding positions,
   wherein the insertion unit is configured to insert the first blank having a width which is set so that a width of the partial image data corrected by the correction unit and the first blank space is an integer multiple of a width of the plurality of rectangular images, and
   wherein the insertion unit is configured to insert the second blank space having a width which is set so that a width of the extracted image data and the second blank space is an integer multiple of a width of the plurality of rectangular images.

5. An image processing apparatus comprising:
   a correction unit that corrects a tilt of each partial image data item which is a result of a plurality of sensors reading a medium on which an image of image data is formed so that at least part of a reading region which is read by each of the plurality of sensors overlaps a reading region of an adjacent sensor;
   an extraction unit that extracts the image data at a position and a size at which the image data matches the respective partial image data; and
   a comparison unit that compares partial image data corrected by the correction unit with extracted image data extracted by the extraction unit,
   wherein the correction unit inserts a first blank space between the partial image data items adjacent to each other so as to correct a tilt thereof, and generates combined image data by combining the partial image data items with each other,
   wherein the image processing apparatus further includes an insertion unit that inserts a second blank space having a size determined based on the first blank space and the tilt of the partial image data, between the extracted image data items adjacent to each other, extracted by the extraction unit, and
   wherein the comparison unit compares the combined image data with image data into which the second blank space is inserted by the insertion unit.

* * * * *